ян G. Fäger et al.

(12) United States Patent
Fäger et al.

(10) Patent No.: US 7,430,489 B2
(45) Date of Patent: Sep. 30, 2008

(54) DEVICE AND A METHOD FOR PRODUCING INFORMATION ABOUT THE PROPERTIES OF AN ENVIRONMENT

(76) Inventors: Jan G. Fäger, Fågelpilsgatan 6, S-723 53 Västerås (SE); Klas Jacobson, Infanterigatan 134, S-723 50 Västerås (SE)

( * ) Notice: Subject to any disclaimer, the term of this patent is extended or adjusted under 35 U.S.C. 154(b) by 47 days.

(21) Appl. No.: 10/392,176

(22) Filed: Mar. 20, 2003

(65) Prior Publication Data

US 2003/0227440 A1 Dec. 11, 2003

Related U.S. Application Data

(63) Continuation of application No. PCT/SE01/02022, filed on Sep. 20, 2001.

(30) Foreign Application Priority Data

Sep. 20, 2000 (SE) .................................... 0003373

(51) Int. Cl.
*G01C 9/00* (2006.01)

(52) U.S. Cl. ...................... 702/152; 702/150

(58) Field of Classification Search ................ 702/150, 702/152; 248/168, 550; 250/253; 33/502; 345/8; 348/211.8; 352/243; 356/620; 382/103; 600/407, 423, 595; 700/245, 259

See application file for complete search history.

(56) References Cited

U.S. PATENT DOCUMENTS

| 4,156,512 | A | * | 5/1979 | Brown ........................ 248/586 |
| 5,227,985 | A | | 7/1993 | DeMenthon |
| 6,006,034 | A | * | 12/1999 | Heath et al. ................. 717/170 |
| 6,176,837 | B1 | * | 1/2001 | Foxlin ........................ 600/595 |
| 6,594,600 | B1 | * | 7/2003 | Arnoul et al. ................. 702/94 |

FOREIGN PATENT DOCUMENTS

| GB | 2 259 823 A | 3/1993 |
| JP | 10-078304 | 3/1998 |
| JP | 10-78304 | 3/1998 |
| WO | 97/11386 | 3/1997 |

* cited by examiner

*Primary Examiner*—John Barlow
*Assistant Examiner*—Stephen J. Cherry
(74) *Attorney, Agent, or Firm*—Young & Thompson (57) ABSTRACT

A device (4) for producing information concerning one or more properties of an environment (1), comprising a sensor (5) movable in relation to the environment, for obtaining information from the environment by recording or measuring one or more properties of the environment in one or more positions and/or directions, and a transducer (6) mechanically connected to the sensor (5) so that the relative positions and orientations of the sensor and the transducer are fixable. The transducer (6) is arranged to determine its orientation and position with respect to at least four degrees of freedom relative to the environment by receiving incident signals from signal sources (7) in the environment and thereby produce corresponding information concerning the orientation and the position of the sensor, for at least one said recording or measuring accomplished by the sensor (5).

32 Claims, 6 Drawing Sheets

DEVICE AND A METHOD FOR PRODUCING INFORMATION ABOUT THE PROPERTIES OF AN ENVIRONMENT

CROSS REFERENCE TO RELATED APPLICATIONS

This application is a Continuation of PCT/SE01/02022 filed Sep. 20, 2001.

TECHNICAL FIELD

The present invention relates to a device for producing information concerning one or more properties of an environment, comprising a sensor movable in relation to the environment, for obtaining information from the environment by recording or measuring of one or more properties of the environment in one or more positions and/or directions. Furthermore, the invention relates to a method for producing information concerning one or more characteristics of an environment, which comprises recording or measuring of one or more characteristics of the environment in one or more positions and/or directions by means of a sensor.

Such a device and such a method may be used for a number of purposes, but hereinafter the particular, but in no way limiting for the invention, fields of application constituting a means for creating models and controlling an object will be described.

Initially, a number of terms used in the present invention will be explained and defined more closely below. In this connection, it is emphasized that the terms "environment", "property", "sensor" and "model" in the text are to be given very broad meanings.

An environment may be constituted by one or more physical objects or parts thereof as well as by an arbitrary volume with or without physical limiting surfaces. The volume or the space may include one or more solid objects and/or contain different mediums in a gas and/or a liquid state. In the environment, both stationary and moveable objects/phenomena may occur. The current environment may be located both outdoors and indoors. In addition, the environment may be a generalized room, for example a reciprocal space.

The term property covers in principle all features of an environment which may be recorded and/or measured. This means that all chemical and physical states and quantities are included and furthermore that all features of the environment related to appearance and extension that may be documented are included. A few examples among all possible properties are: that an object is present in a solid state, that a certain oxygen content is present in a position, that a gas has a certain temperature, that an object or a part thereof has a special extension, shape, texture or colour etc, that any vectorial property is present in a position, such as a magnetic field, acoustic field, flow etc.

Furthermore, it is pointed out that the term "sensor" is to be regarded as a generic term for different instruments, which may possible be used for recording and/or measuring of the properties of an environment in accordance with the above-mentioned definition. In this connection, sensors are included which are directional as well as non-directional, and point-sensors as well as sensors designed as arrays. The sensor may be of a type that records/measures a property in a position either while the sensor is placed substantially in the present position or while the sensor is placed at a distance therefrom. Furthermore, the sensor may be able to emit and/or receive electromagnetic radiation or acoustic waves. A few examples of sensors are: IR-camera, telescope, film camera, video camera, still camera, GM-counter, UV-detector, microwave aerial, thermometer, anemometer, microphone, etc. It should be emphasized that the sensor in one and the same device may include more than one instrument and that the instruments may have different characteristics. Hereby it is stressed that the term "one sensor" used in the patent claims in no way restricts the possibility to actually use two or more instruments, which may quite possibly be arranged for recording or measuring different properties of an environment.

A particular type of sensor is constituted by optical instruments for obtaining pictures. As will be clear from the following, a camera is used as a sensor in many important applications of the invention. The term camera comprises film cameras, video cameras, still cameras, stereo cameras, IR-cameras etc. This means that photographing and filming are classed as recording of properties of an environment, and more particularly these methods are firstly used for recording the properties related to the appearance and/or the extension of an environment.

It should also be emphasized that the term "model" is intended to comprise everything from very simple models of environments, such as few co-ordinated data, graphs, drawings, maps etc, to more advanced two-, three- or higher dimensional models which may be moved, rotated, changed or processed in any other way, for example in a computer graphic environment for picture processing and/or evaluation, and also the most advanced models as regards interactive application, the so called virtual reality (VR) models, in which a suer in a virtual way may take part of the properties of an environment. A special type of models are different types of computer games, particularly such that are interactive. Furthermore, the models may include photographic still pictures and moving pictures in the form of film sequences. In a three-dimensional model, vectorial quantities, such as a gas flow, may be illustrated by means of arrows in such a way that the direction and length of an arrow denote the direction and the value, respectively, of the present quantity. Furthermore, other quantities, which very often are non unisotropic quantities, such as temperatures, radiation intensities etc, may be illustrated in the form of differently coloured transparent surfaces representing surfaces in a volume along which surfaces the current quantity has a constant value. In addition, holographic illustrations and models of abstract and mathematical character are also included, such as those, which depict an environment by means of for example reciprocal spaces.

Furthermore, the terms "position" and "orientation" have the following meanings. A three dimensional object may have up to six degrees of freedom in relation to the room, three translations, and three rotations. The "position" of the object is defined by the three quantities which denote translations in relation to the origo of a current coordinate system. These are denoted in this application by x, y and z. The "orientation" of the object is defined by the three quantities, which denote the angels of rotation of the object in the coordinate system. These are denoted in this application by $\alpha$, $\beta$ and $\gamma$. In practice, an article or another object often has a number of degrees of freedom which is less than six. A cursor on a computer display, for instance, usually has two degrees of freedom. Its orientation is constant (or irrelevant), and its position is characterised by two variables. Similarly, a three dimensional object may have such limitations that it has fewer than six degrees of freedom. For example, a block movable on a table has three degrees of freedom—two variables indicate its position on the table top and one variable its orientation, i.e. its angle of rotation about an axis perpendicular to the table top.

Furthermore, it should be pointed out that although applications are initially described below in which the relative movements between the device, or at least parts thereof, and the environment, is performed by moving the device itself, it is in some cases possible to use a stationary device and instead accomplish the relative movement by moving the environment, for example in the cases in which the environment is constituted by an object which is not stationary installed.

Nowadays extensive work for accomplishing models of different types in many different application fields is in progress, preferably three-dimensional models intended to be used in a computer graphic environment. The models are intended to represent an environment and show at least some of the characteristics which the environment posses, i.e. the models may for example aim at imitating the environment to such a large extent as possible so that information about the properties of the environment may be obtained through the model.

As mentioned above, one type of model which attempts to reproduce the properties of an environment, and in particular the appearance of the environment, is the models which are denoted virtual reality (VR) models. These have the characteristics that a user may "move himself" virtually in the model for example by using so called 3D-glasses and the required communication with a computer. Thus, a user may for example virtually visit the present environment and, by means of the model, participate in the properties of the real environment. In an advanced VR-model, besides the possibilities to study the properties of the environment from different positions and directions there is the possibility to perform active actions, such as to change the properties of the model and thereby receive information about which consequences such a corresponding modification in the real environment would result in.

BACKGROUND OF THE INVENTION

For obtaining the required information about the properties of an environment when creating models, at present arrangements often comprising two or more cameras, for example video cameras or similar, for picture recording of the environment, are used.

One example of the state of the art is the using of so-called stereo cameras. Preferably, two mechanically fixedly connected cameras are used, which have carefully measured or, by exposures of common objects, calculated mutual positions and orientations, With such an arrangement, basic image data may be obtained consisting of large quantities of two-dimensional pictures, most often in pairs, of the environment. However, this basic image data requires considerable processing, including the use of advanced statistical algorithms, which require very heavy calculation power to be able to be transformed to a three-dimensional model of the environment. The fact that several cameras, special mechanics and a lot of calculation work is usually required makes the method costly and time consuming, which in practice means that the standards of quality of the model have to be lowered.

Another method for achieving a three-dimensional model is so-called 3D scanning. In this case the object, which constitutes the basis for the model, is located on a rotating table. Furthermore, the table is suitably vertically adjustable in relation to a scanner located at a distance from the object. By performing repeated measurements of the distance between the scanner and the object by means of the scanner while simultaneously rotating the table, and possibly moving the table vertically, distance information as a function of rotated angle of the table, and the current elevation of the object, is obtained. This distance information may then be used for creating a model of the object. This method however, has great limitations since it is suitable only for producing models of proportionally small objects having elementary shapes. Another weakness is that the object and the scanner are not able to be moved freely in relation to each other during the measuring procedure. It would be desirable to perform measurements from arbitrary positions and in arbitrary directions for obtaining detailed information about the characteristics of the object in the most efficient way.

A further technique for achieving a description of an environment for VR-applications, for instance, is the panoramic technique. It is based on the whole horizon or a great part thereof being photographed from a number of different positions and these pictures being joined together in a computer model. In using the model the viewer can move himself virtually between different positions, the number of which is dependent of the number of picture recording positions which the model was based on. The technique is commercially available and is described for example in U.S. Pat. No. 5,841,440 by Apple Computer Inc and in U.S. Pat. No. 5,684,943 by VPL Research Inc.

SUMMARY OF THE INVENTION

The object of the present invention is to provide a device of a type defined in the introduction, which at least in some respect is improved in relation to such devices discussed above.

This object is attained according to the invention by the device including a transducer mechanically connected to the sensor so that the relative positions and orientations of the sensor and the transducer are fixable, and that the transducer is arranged to determine its orientation and position with respect to at least four degrees of freedom relative to the environment by receiving incident signals from signal sources in the environment, and thereby produce corresponding information concerning the orientation and the position of the sensor, with respect to at least four degrees of freedom of the sensor, relative to the environment, for at least one said recording or measuring accomplished by the sensor and in that the device is designed to emit the recording or measuring information and the orientation and position information, the recording or measuring information and the orientation and position information defining at least one property of the environment. In this way it is enabled that the device may be used for obtaining information about the properties of the environment and information which is related to how the sensor is orientated and located in relation to the environment when the property-information is recorded.

In the processing of the three-dimensional problems/phenomena, for example in producing three-dimensional models, it is most favourable if all the six degrees of freedom of the sensor are known, but sufficiently good results may often be obtained with the knowledge about five or four degrees of freedom through approximation and/or that favourable symmetry is present. By way of example, determination of only five degrees of freedom is required in the case that the sensor has a rotational symmetry about its recording direction, which is the case for one-point bolometers and shielded GM-counters, for instance. As a consequence of the orientation and the position of the transducer and thereby of the sensor, being determined with respect to four degrees of freedom, information is also always obtained about at least one parameter from the both sets of parameters consisting of three translations and three rotations, respectively. This is often a requirement to obtain sufficient information. Usually, however, it is not sufficient that only one position parameter and one orientation parameter are known. In applications in which less than four degrees of freedom need to be determined, it usually depends on either the occurrence of extensive symmetry or that certain degrees of freedom are given by mechanical conditions. If such conditions are not present, the knowledge of less then four degrees of freedom is normally not sufficient for the current applications, since in such a case only very trivial cases may be treated.

In addition, as a consequence of the characteristics of the transducer the sensor may be designed to be freely movable and mechanically unguided in relation to the environment since the position and the orientation of the sensor may be determined by a transducer, which in turn results in very high performance, since the device in this way may be used in arbitrary positions and directions. The characteristic that the transducer determines its position and orientation by receiving signals from signal sources in the environment results in that the device may be designed to be used for absolute measurements, i.e. not only relative alterations in position/orientation of the transducer but also its actual position/orientation in relation to the signal sources and thereby to the environment, may be determined, and thereby the methods of docking, aligning, synchronising and/or setting to zero which are required in other occurring types of transducers, such as accelerometers and gyros, are eliminated.

By way of example the device may obtain information about one and the same point in the environment through a plurality of different recordings or measurements accomplished from different positions, but with the sensor directed toward the current point in the different recordings/measurements. If the sensor is constituted by a camera for generating pictures, for example textures of the environment may be recorded/measured, which textures have different properties in one and the same point depending on from which direction the point is observed, and data may be produced for subsequent modelling in a VR-model. Examples of such textures are velvet and holograms. Furthermore, the device enables production of data representing pictures in such a way that a division of the properties of the pictures in properties related to the appearance, such as textures etc, and in properties related to the extension, such as shape, length etc, is obtained and thereby these characteristics may be treated separately, for example in a subsequent modelling of the environment.

Thus, by means of the invention a device is obtained of the type defined in the introduction having the capability to produce information which defines/represents the properties of an environment, for which environment and/or for at least some property of the environment already known devices are not able to produce representative information or only produce the information to a small extent. In addition, by means of the invention, information that defines/represents the properties of an environment may be produced with higher accuracy than what is possible by using of already known devices. Furthermore, the device according to the invention is capable of producing information that defines/represents the properties of an environment and producing said information by means of considerably fewer recordings or measurements compared to the use of already known devices. The device according to the invention is also able to produce information which defines/represents the characteristics of an environment and to produce said information by means of less and/or simpler recording and/or measuring instruments compared to the use of already known devices. In addition, by means of the device according to the invention, information may be produced which defines/represents the properties of an environment and said information may also be produced during a considerably shorter period of time than the period which is required in the use of already known devices. The device according to the invention neither requires extensive and/or repeated docking, aligning, synchronising and/or setting to zero, at least with regard to the transducer.

According to a preferred embodiment of the device according to the invention, the transducer is arranged to repeatedly determine its orientation and position relative to the environment when moving the transducer and the environment with respect to each other. Hereby it is achieved that recording or measuring of properties of the environment may be performed with the sensor located in different positions and/or orientations relative to the environment while the transducer may produce corresponding information about the orientation and the position of the sensor relative to the environment. This means that through movement of the sensor in relation to an environment the properties of the environment may be mapped. For example the properties of a room may be mapped and data enabling production of a two- or three-dimensional map or model over the properties of the room may be produced.

According to another preferred embodiment of the invention, the transducer is arranged to be freely movable and mechanically unguided by the environment in an arbitrary coordinate system when moving the transducer and the environment with respect to each other. By the fact that no mechanic connection with the environment is present which forces the transducer and thereby the sensor to follow any axis or any plane in a certain coordinate system, besides possible cables for signal and/or power transmission for instance, a very large freedom of movement and simplicity in the use of the device is obtained. In creating a model, in the general case a number of recordings may be required to obtain a sufficient amount of information. Assume for example that it is desired to create a model of an office room. The device according to the invention enables in this case the accomplishment of recording property-information for normally "hidden" positions, simultaneously that the orientation and position information about the sensor may be obtained, so that a model, which works for the properties which are hidden from certain viewing directions, may be produced. The hidden positions may be located under a desk, behind chairs, in a wastepaper basket etc.

According to another preferred embodiment of the invention, the transducer is designed with a signal receiving direction area exceeding 0,2 steradians (st), which constitutes a solid angle, and which is formed by the collected amount of signal receiving directions in which the transducer is arranged to receive incident signals from said signal sources. Other preferred embodiments include a transducer with a signal receiving direction area exceeding 1 steradian, 2 steradians and 4 steradians, respectively. Said signal receiving direction area may have any shape and spreading over the imaged solid angle sphere. According to a preferred embodiment of the invention, the signal receiving direction area of the transducer is topologically connected, which however includes that it could have enclosed direction areas without signal receiving capability. The signal receiving direction area is independent of external factors and relates only to the receiving directions of the transducer. It is not affected by limitations in the form of external blockage of direction areas or any partial absence of signal sources. Thus, the transducer of the device according to the invention has a proportionately broad signal receiving direction area, which is advantageous for the reason that the larger the angle of the signal receiving direction area, the fewer signal sources are required for achieving a certain accuracy in the determining of the orientation and the position of the transducer. Thus, a high precision of calculation and a need of a low number of reference points are obtained through a broad signal receiving direction area. Particularly, the accuracy is improved with regard to the determination of the position along the axis of the transducer, i.e. in the main direction of the transducer. Another advantage with a broad signal receiving direction area is that the risk is smaller that a large portion of the signals receiving directions of the transducer "are hidden" by different obstacles.

According to a further preferred embodiment of the invention, the device includes means for establishing connections for communication of information between the sensor and an information processing unit and between the transducer and the information processing unit, the information processing unit being arranged to combine the recording of measuring information and the orientation and position information for producing data that represents the property/properties of the environment. The information processing unit, which may have data storing capacity as well as calculation capacity, means that information from the sensor and information from the transducer may be stored, combined, synchronised, classified and used in calculating, for producing the desired data which defines/represents the properties of the environment in accordance with the present requirements.

According to another embodiment of the invention, the device is designed to produce information intended for a computer graphic model. Such a device may be advantageously used for collecting data about the environment by means of which data a virtual reality (VR) model of the environment may be created in a computer graphic environment, for instance. For example there is a possibility to create a VR-model of a room in which room model a user by using for example 3D-glasses and the required communication with a computer may "move himself" and from different positions and angles study or use properties which correspond with the properties of the real room.

According to another embodiment of the invention, the device is designed to produce information for controlling an object. In this connection, it is possible to control an object on the basis of the properties, determined by means of the device, of the environment. This object may for example be any kind of cursor illustrated in a computer environment, the response of the cursor being related to the properties of the environment to the sensor, or a robot, or the like.

According to a further embodiment of the invention, the device includes the controlled object and, in some cases, the sensor constitutes the object itself. The combination of these features of the device results in a feedback coupling possibility which means that the required controlling of the sensor, i.e. the effect of the recording or measuring frequency of the sensor and the moving thereof in relation to the environment etc, may be based on previous recordings or measurements of the properties of the environment.

According to another preferred embodiment of the invention, the sensor is an optical instrument designed for picture recording. By means of such a device, data with very high accuracy may be obtained about the properties related to the appearance and the extension of an environment. The data may be used in many different applications in which knowledge is desired about from which position and in which direction, relative to the environment, a certain picture recording has been performed. In particular, such a device is usable in filming and in supplementing animation of recorded film.

According to a further preferred embodiment of the invention, the sensor is an instrument designed for recording one or more physical and/or chemical states present in the environment. Such a constituted device would for example provide information about whether there are solid objects present in the environment or not, for example accumulated coatings and similar, the position and the distribution of which are previously unknown.

According to another preferred embodiment of the invention the sensor is an instrument designed for measuring of one ore more physical and/or chemical quantities occurring in the environment. In this case it is possible through repeated measurements with the device to produce data enabling production of a two- or three dimensional map or model which illustrates the distribution of a special substance or a special chemical compound in an environment, for example how the content of carbon dioxide is distributed in an environment to a traffic section. This may also be combined with obtaining information of a physical quantity, for example the current temperatures in different positions in the environment, and thereby models which illustrate relations between many different properties of the environment may be produced.

The invention also relates to a method of the type defined in the introduction, which is characterised by what is state in the characterising part of the annexed independent method claim. Such a method results in a substantially more efficient procedure for producing information which defines/represents the properties of an environment.

Further advantages and advantageous features of the device according to the invention and the method according to the invention are disclosed in the following description and remaining dependent claims.

The invention also relates to different uses of the device according to the invention. The functions and the advantages of the uses appear from the following description and the claims.

The invention also relates to a computer program and a computer readable medium according to corresponding appended claims. It is obvious that the method according to the invention defined in the set of method claims enclosed is very suitable to be accomplished through program instructions from a processor which may be effected by a computer program provided with the program steps in question.

BRIEF DESCRIPTION OF THE DRAWINGS

A detailed description of embodiments of the invention will be provided below by way of example only and with reference to the attached drawings.

In the drawings:

FIG. 6 is a perspective view of an environment, a variant of the device according to the invention being used for controlling an object.

DETAILED DESCRIPTION OF PREFERRED EMBODIMENTS OF THE INVENTION

Figure 1:
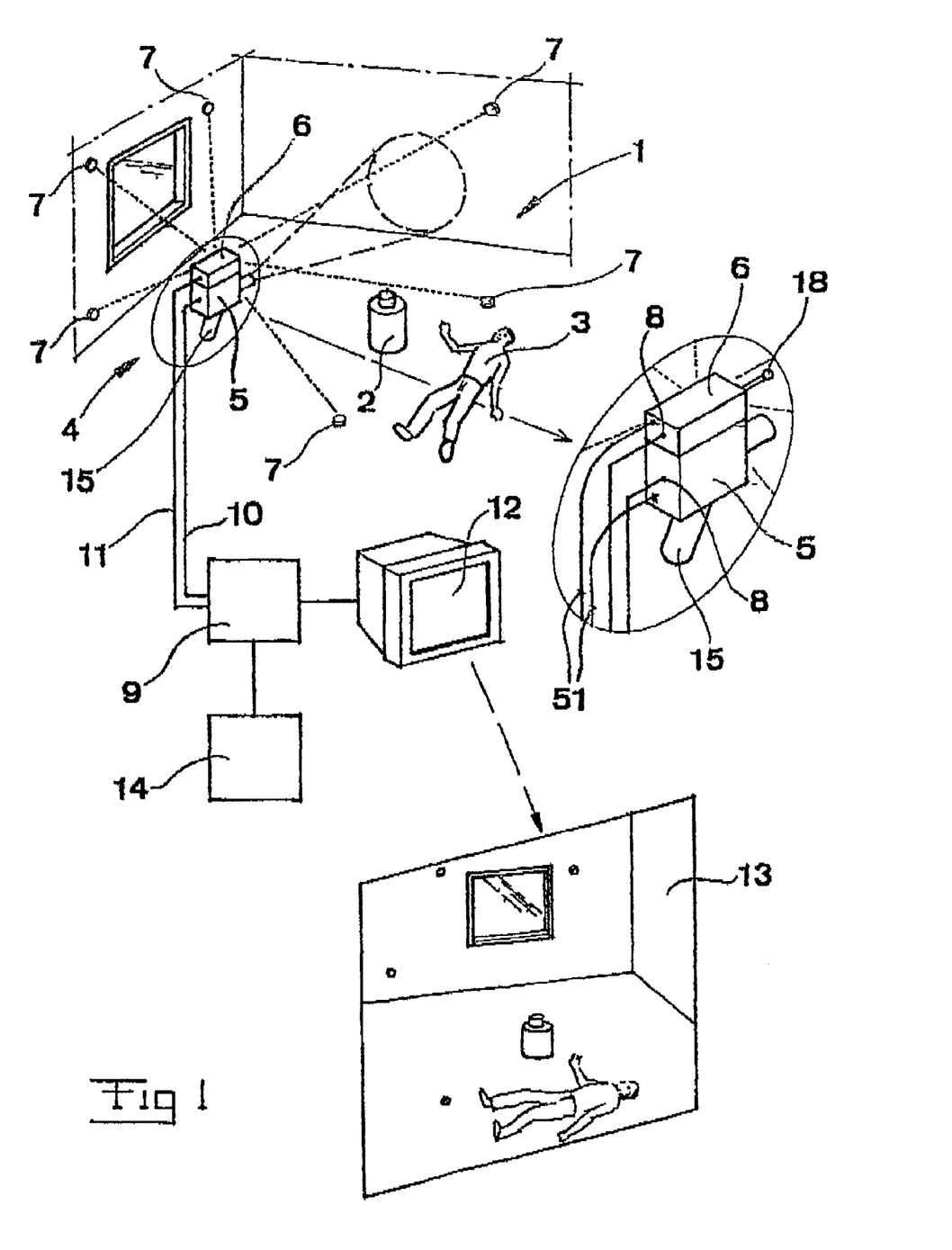
FIG. 1 is a perspective view of an environment in the shape of a room and the device according to the invention, and information processing equipment connected to the device.

In FIG. 1 an environment 1 is illustrated which is constituted by a room, some of the limitation surfaces of the room and two objects 2,3 present in the room. The room is for the sake of clarity schematically illustrated, but in practice it may be an arbitrary room having many different properties. The environment 1 could be an apartment for which it is desired to establish a model for example with the purpose that an estate agent via computer communication would show the apartment for customers by giving the customers an opportunity to experience the apartment in a VR-model. Examples of other places which could be of interest to make models of are places where crimes have been perpetrated, traffic sections, etc.

The device 4 according to the invention for producing information concerning the properties of the environment 1 comprises a sensor 5 moveable in relation to the environment, for obtaining information from the environment 1 by recording or measuring of one or more properties of the environment 1 in one or more positions and/or directions. Usually the properties of the environment are dependent on which position of the environment that is studied. However, in some cases one and the same position may have different properties depending on in which viewing direction the position is studied. This concerns holograms and some surface structures, such as a velvet surface, for instance. The sensor 5 is in this case a camera for picture recording. Furthermore, the device 4 includes a transducer 6 mechanically connected to the camera 5 so that the relative positions and orientations of the camera 5 and the transducer 6 are fixable. For this reason the transducer 6 and the sensor 5 may be firmly assembled to each other or be interconnected so that they may be separated and/or adjusted in relation to each other if desired. For obtaining one or more mutual fixed adjustments between the transducer 6 and the sensor 5 conventional mechanical components may be applied, such as guide pins, locking mechanisms etc. The main thing is that the relative positions and orientations of the transducer 6 and the sensor 5 may be fixed with respect to all the six degrees of freedom. However, it is not necessary that all mutual orientations and positions are known in advance, since at least some of these may be calculated by means of the information emerged in using of the device 4. The calculation work, however, is simplified if the fixed mutual positions and orientations of the sensor 5 and the transducer 6 are known in advance. In the case with a number of selectable adjustment possibilities a simpler indicator of any kind may also be used to indicate the current adjustment between the transducer 6 and the sensor 5.

The transducer 6 is arranged to receive incident signals from signal sources 7 in the environment 1, which signals propagating rectilinearly between the signal sources 7 and the transducer 6, for obtaining the orientation and position information. For determining four degrees of freedom, relative to the room, of the transducer 6, at least two different signal sources 7 is needed, and in the most cases at least three signal sources 7 is needed. Utilizing only two signal sources requires simple cases, for example by that favourable symmetry is present, or that certain position and orientation information may be obtained in another way. In the case it is desired to determine all the six degrees of freedom at least three, often four signal sources 7 is needed. In the most cases it is an advantage to use a larger number of signal sources 7.

The signal sources 7 may be included in the device 4, i.e. for the purpose particularly placed in the environment 1 from which information may be obtained, but they may also be constituted by objects naturally occurring in the environment.

One type of transducer which may be used as a component in the device according to the invention has been developed and introduced into the market by Meeq AB, Flottiljgatan 61, S-721 31 Västerås, Sweden.

With the expression that the position and the orientation of the sensor 5 are determined, in this application is intended, if other is not indicated, that at least four parameters of said three position parameters x, y, z and said three orientation parameters $\alpha$, $\beta$, $\gamma$ are known in a coordinate system, the relation to the environment of which is known.

The device 4 according to the invention includes as mentioned a transducer 6 with the capability to determine at least four degrees of freedom and up to all the six degrees of freedom of the sensor 5, but such device may with advantage be used also in case when knowledge about a less number of degrees of freedom of the sensor is required. The function of the transducer 6 and the signal sources 7 will be described further below.

Thus, by means of the transducer 6 the position and the orientation of the sensor 5 relative to the environment 1 may be determined. This means that for one or more recordings or measurements, the orientation and the position of the sensor 5 at respective recording or measuring occasion may be determined. In the example of embodiment illustrated in FIG. 1 the device 4 may thus produce orientation and position information for the camera 5 by means of the transducer 6, which information is related to one or more picture recordings.

Furthermore, the device 4 is provided with means 8 for emitting the recording or measurement information, herein the picture information, and the orientation and position information, in the form of signals, to an information processing unit 9 and/or to another external information processing and/or displaying unit. These signal emitting means 8, for example contact members or transmitters for wireless transmission, together with electrical connections 10,11, or receivers for wireless signal reception, provides for transmission of the recording or measuring information and the orientation and position information, which said recording or measuring information and said orientation and position information defines/represents the properties of the environment 1, to the information processing unit 9. In many cases the device 4 is designed so that signal transmission also is possible in the opposite direction, i.e. from the information processing unit 9 to the sensor 5 and/or transducer 6, the information processing unit 9 having signal emitting means and the sensor 5 and/or the transducer 6 having the corresponding signal receiving means. In FIG. 1 cables 51 for power supply to the sensor 5 and the transducer 6 are also schematically illustrated.

By means of the information processing unit 9 including a suitable computer software, which unit may have data storing capacity and calculation capability, picture signals from the camera 5 and orientation and position signals from the transducer 6 may be stored, coordinated, classified, used as the base for calculation etc, for producing data of the type desired that represents the properties of the environment 1. For obtaining a consummate result it is required that the transducer 6 is able to produce the orientation and position information with regard to the camera 5 with a higher accuracy than the smallest resolution in the picture information.

The treated information in the form of processed data may then be transferred from the information processing unit 9 to a suitable presentation means 12, for example a conventional viewing screen, a more advanced computer graphic environment or a holographic display unit. In this connection it should be mentioned that the device 4 may be designed to produce data, or information in another form, for producing as well as supplementing a model 13 of the environment and in the latter case designed to cooperate with an already existing model. Previously known information about an environment, such as the construction of a room in a broad outline, some positions of objects in the room etc, which information may be obtained from for example drawings, may be used and run together so that the collecting of property-information of the environment by means of the device according to the invention may be concentrated on properties of the environment which are not previously known. By way of example the device could be used for adding further property-information to a present model of a building, where the information is in the form of texture, pattern, colours and similar properties of the walls of the building. The model is supplied with the current property-information in the form corresponding to the condition that the building actually has, i.e. it is not a question of a stereotype applying of any property, such as a wallpaper pattern in general or similar, but the present properties are determined, transferred and placed in the corresponding positions of the model. This results in that the misfittings of for example a pattern, such as wallpaper joints or similar, will be described correctly. In FIG. 1 it is schematically illustrated how the information-processing unit 9 cooperates with a computer unit 14, which for example could work with a CAD-program.

In connection with producing of a model the device may be constituted to produce, besides the recording or measuring information and the orientation and position information, additional information for supplementing the obtained information concerning the properties of the environment with said additional information regarding where and when the current obtaining of information was performed, during which external conditions, such as light and temperature, and/or adjustments of the device the obtaining of information was performed etc. It may be of great importance, to be able to document in a reliable way that the information obtained refers to a specific location at a specific moment and during certain conditions to be able to avoid that the authenticity of a model created by means of the property-information will we questioned. By way of example this may be very important in the documentation of places where crimes have been committed, traffic accidents and similar, where the model will be used as basic data for investigation and/or such as evidence in a trial.

In the using of the device 4 according to the invention it is suitably proceeded so that first the transducer 6 obtains signals from at least three, preferably four and usually five signal sources, which define the coordinate system of the environment, by that the camera 5 and the transducer 6, which are mechanically connected, are moved throughout the room 1, until the device has received sufficient information about the positions of the signal sources 7, i.e. about the coordinate system of the environment 1, which may be performed by hand by a person or by means of a vehicle, a freely movable robot or similar. In the example of embodiment of the device 4, more closely the assembly including the transducer 6 and the sensor 5, is intended to be carried by hand and thus it has for that reason a requisite handle 15. If in addition it is required that during the subsequent recordings/measurements the absolute scale of length in determination of the orientations and the positions shall be known, the measuring of signal sources 7 is performed while simultaneously using a measure standard, for example by placing an object with well known dimensions as a reference gauge in the environment during the measuring procedure.

In the method according to the invention, the transducer 6 is suitably arranged to repeatedly determine its orientation and position relative to the environment 1 when the transducer 6 and the environment 1 are moved relative to each other, the method including to repeatedly determine the orientation and the position of the camera 5, with respect to at least four degrees of freedom related to the room, for the camera 5, when the sensor/camera 5 and the environment 1 are moved relative to each other, and to produce data/information, which represents property/properties of the environment 1, on the basis of the picture information and the orientation and position information. With the purpose of simplifying the coordination of the recording or measuring information and the orientation and position information the device is suitably constituted so that the sensor 5 controls when the transducer 6 is to perform the respective orientation and position determination. In the use of a camera 5 such as a sensor it may be arranged that the picture synchronising of the camera 5 triggers the orientation and position measuring of the transducer 6.

In a preferred embodiment the transducer 6 and thereby the sensor 5 is arranged to be freely movable and mechanically unguided by the environment 1 in an arbitrary coordinate system when the transducer 6 and the environment 1 are moved relative to each other. Thus, in this case the sensor 5 may be moved freely and mechanically unguided relative to the environment 1 in an arbitrary coordinate system. From this follows great advantages by that the camera 5 may be located in arbitrary positions and orientations relative to the environment 1 and thereby the picture recording may be concentrated to particular interesting or picture demanding parts of the environment 1. The device 4 according to the invention designed so it is mechanically unbound to the environment 1 and mechanically unguided by the environment, means that the obtaining of the property-information may be performed in a way that is fundamentally different from prior art of the type scanning. With the device according to the invention recording and measuring may be performed in arbitrary positions and directions. For example, thereby information may be obtained concerning one and the same point in the environment through repeated direction dependent measurements and/or recordings performed from different positions but with the sensor directed toward the current point during the different recordings/measurements. It is also possible to repeatedly perform recordings/measurements for one and the same environment with respect to the same positions and/or directions of the sensor at different moments, but with different conditions of the environment. In this case information may be obtained concerning for example how the properties, related to the appearance, of an environment vary with different conditions of the light.

The transducer may be a two-dimensional transducer of the kind which is described in the Swedish patent number 444 530. Thus, the transducer 6 may be an optical instrument, which works with "optical signals", which in this application refers to signals which are constituted by, or utilize, optical radiation within as well as outside the band of visible wave lengths. A number of signal sources 7 in the form of light emitting diodes for instance, may be arranged at a distance from the transducer 6 and from each other, and so that in normal use of the transducer 6 always at least three, preferably four of the signal sources 7 simultaneously are present within the field of view of the transducer. The positions of the signal sources 7 relative to each other are known, for example by measuring the positions of the sources in a coordinate system common to the sources, which measuring may be performed by means of the transducer 6. Concerning measuring in general reference is made to the Swedish patent number 506,517.

The transducer 6 is in connection with a calculation unit, which suitably is included in the information processing unit 9 via a communication channel. However, it is also possible to place the calculation unit, or the whole information processing unit, in connection directly to the assembly consisting of the transducer 6 and the sensor 5. The communication channel may be constituted by a flexible cable 11 or—for allowing as large freedom of movement as possible to the operator—by wireless link, for example an IR-link or a radio link, for example "Bluetooth" technique from Ericsson Components AB in Kista, Sweden. Through this channel, information concerning how the different signals from the signal sources 7 incident on the transducer 6 is delivered to the calculation unit form the transducer 6.

The calculation unit continuously calculates position and orientation of the transducer 6. In one embodiment of the device according to the invention the transducer 6 is designed to receive transmitted signals from the signal sources 7 and record the relative incident directions of the signals received in relation to the transducer. This must not be performed by using optical signals, but may also be performed by using for example microwaves and antenna arrays, so called phased arrays. The transducer may for example be a radar unit designed for transmitting radar waves and receiving radar echoes from signal sources in the environment. Based on the incident directions of the radar echoes the calculation unit may then calculate the position and the orientation of the transducer and thereby the position and the orientation of the sensor.

In some cases the transducer has a surface 16 designed to receive transmitted signals from the signal sources and record the relative incident directions of the signals received in relation to the surface and/or the relative incident positions of the received signals on the surface. In this case for example a video camera of CCD-type and a wide angle lens may be used as a transducer and if the sensor is a camera in one embodiment of the invention the transducer 6b and sensor 5b may have a unit in common in the form of a detector 17. A detector 17 in common means a detector which receives incident signals from both the signal sources 7 and other incident light for picture production from the environment 1. The signals of the signal sources 7 and the recordings performed for the picture production are then separated and are processed separately in the transducer 6b and the sensor 5b, respectively.

Figure 2:
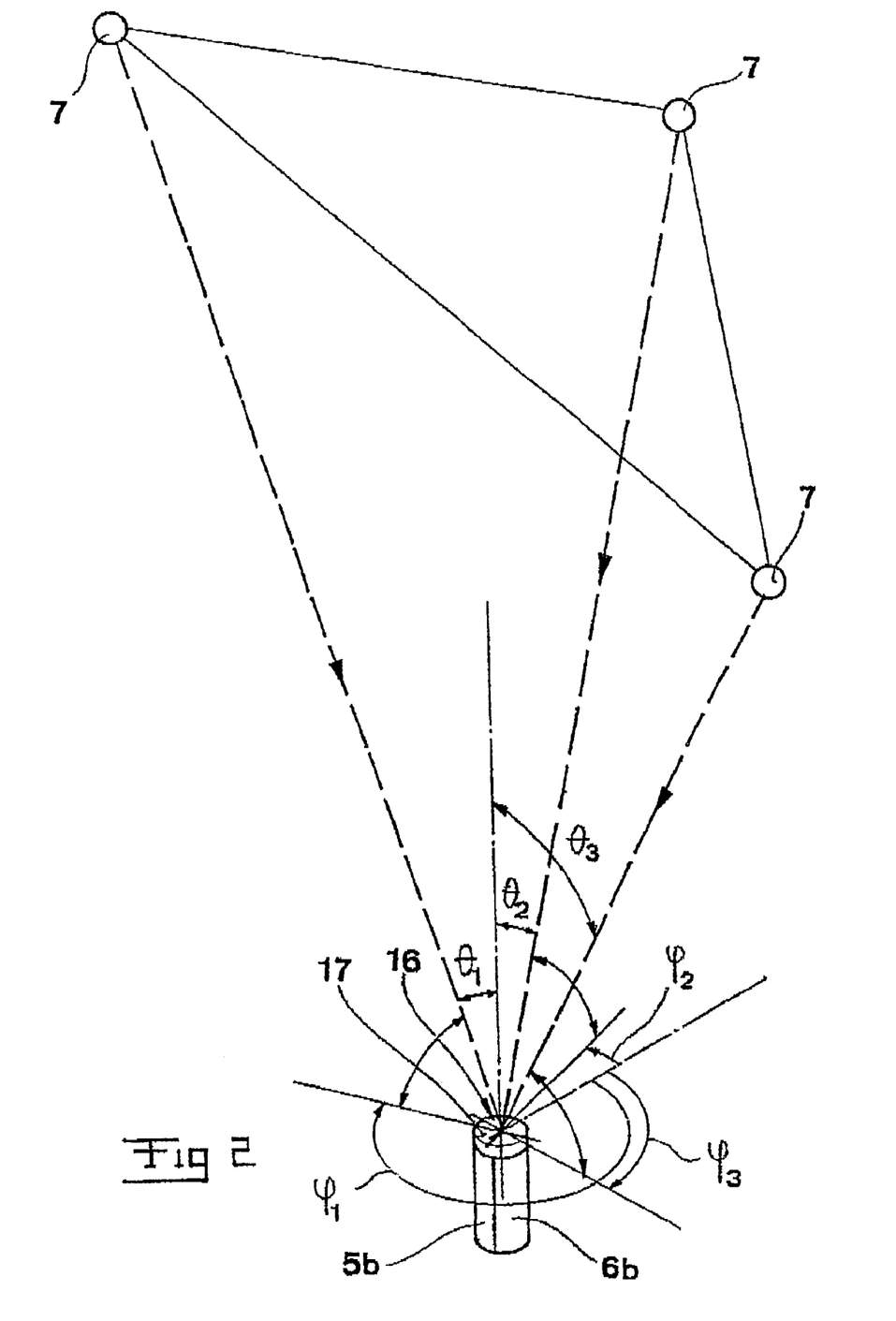
FIG. 2 is a schematic perspective view of a detector according to the invention and incident signals on the detector originated from signal sources in the environment.

In FIG. 2 it is schematically illustrated how signals from three signal sources 7 incident on the detector 17 and how the incident angles of the received signals are related to each other. The incident direction for respective signal is defined by $\phi_i$ and $\Theta_i$, where i=1, 2 or 3. The incident directions are then the basis for calculating the orientation and position information required. Furthermore, in this embodiment it is imagined that the detector 17, is common to the transducer 6b and the sensor 5b.

Briefly, the orientation and position calculation may in this case be performed by that three, in general four, signal sources 7 are picked out, the directions in relation to the transducer 6 of the sightlines from the transducer 6 to these signal sources 7 are determined, the position and the orientation of the transducer 6 being obtained through using the directions of the sightlines, and the known positions of the signal sources 7 and geometrical relations between these quantities. The positions of the signal sources 7 relative to each other are assumed to be known. Alternatively, the relative positions of the signals sources 7 may be known indirectly through that the position of each source is known in a coordinate system.

The construction of the transducer and the construction of the corresponding calculating circuits and the function thereof are as mentioned before more closely described in the above-mentioned Swedish patent number 444 530.

Advantageously, the signal receiving direction area of the transducer 6 is at least 0,2 steradians, otherwise it is difficult to maintain the performance concerning the determinations along the axis of the transducer, so that this is in parity with the two other axes of the transducer. However, preferably this signal receiving direction area is at least 1 steradian, and the larger such area, the fewer number of signal sources are required in the environment to obtain a certain accuracy in determining of the orientation and the position of the transducer relative to the environment. The more objects which move in the environment, and the more complicated geometry of the environment due to for example protruding boxes, oblique corners and other things that obstruct, the larger said signal receiving direction area should be, and in a workshop with a lot of movable parts it may be advantageously to have a signal receiving direction area exceeding 4 steradians, and still possibly more than 100 signal sources may be needed in the environment for attaining a reliable determination of the orientation and position information for the transducer. In that case, it is also preferred that the signal receiving direction area is topologically connected, even if this is not any definite necessity.

It is preferred that the signal sources are well spread out within the signal receiving direction area of the transducer, since this improves the probability that an arising disturbance, such as obscuring of some part of the environment through persons, fork lifters, robots or similar, does not prevent achieving correct information, even if the number of signal sources in the environment are kept on a proportionately low level. However, it is really the design of the device according to the invention, especially with a broad signal receiving direction area, that makes such a well spreading not as important as in previous known devices of this type.

About the signal receiving direction area the following may be added:

A signal receiving direction area comprising less than 0,2 steradians is for natural reasons difficult to use in practice, since in such a case a small number of objects blocking in the environment may easily disturb the transducer so it does not work. In addition, in the case of such small signal receiving direction areas the number of required signal sources in the environment becomes impractically large and it is that which in practice restricts the user. In addition, with such small, particularly if they are connected to each other, signal receiving direction areas it will be difficult to maintain the same high measuring accuracy of positions in all position measuring directions.

Preferably, the signal receiving direction area should exceed 1 steradian, so that the number of required signal sources becomes reasonably large and so that a fairly uniform measuring accuracy of positions then may be obtained.

If the environment is geometrically complex, with for example many and possibly movable objects, reflecting/mirroring surfaces and/or transducer positions in the vicinity of big objects without signal sources, where a typical such an environment may be a film studio in which many persons, cameras, properties, side scenes, mirrors and vehicles are present simultaneously, the signal receiving direction area should exceed 2 steradians. A further reason for a larger signal receiving direction area is that the transducer shall not have a restricted working range as regards firstly orientations because of large hidden sectors without signal sources. Particularly, in complex environments where it is occurring large objects blocking signal sources and the number of signal sources is limited, it is desired with signal receiving direction areas, which also exceed 4 steradians.

The distribution of signal sources over the working range may preferably be adapted to the requirements of measuring accuracy in different parts of the environment and to the nature of the environment. This considerably facilitates the possibility to use signal sources naturally occurring in the environment. The need of the number of signal sources certainly depends on also the signal receiving direction area of the transducer, in accordance with the above mentioned, since the smallest number of signal sources registered by the transducer in the normal case must be equal to or exceed 4. An increased number of signal sources gives, however, both higher accuracy and improved durability against further disturbances.

The signal sources 7 may be active signal emitting sources, such as light emitting diodes or the like, the light of which may possibly be pulsated or modulated, or passive signal sources such as reflecting markers made of for example reflecting tape. The markers may be plane figures or—to show the same shape independent of the viewing direction—be constituted by reflecting spheres. Furthermore, the markers may have different shapes in relation to each other to make it easy for the calculation unit and the signal processing circuits thereof to identify and keep apart different markers and alternatively, with the same purpose, markers with the same shape but with different sizes and/or "colour" may be used, the colour term including also not visible parts of the electromagnetic spectra. In the use of passive reflecting signal sources, such as illustrated in FIG. 1, the device may include means 18 for transmitting of signals intended to be reflected by the reflecting markers. The transmitting means 18, which in such case suitably are arranged in connection to the transducer 6, may transmit infrared light for instance, preferably pulsated or modulated with a certain frequency to be able to separate the current signals from interfering light sources, for instance.

In an alternative embodiment no specially arranged signal sources are required, but as signal sources are used suitable details already present in the environment. Examples of suitable details are corners, holes and similar, which have a characteristic appearance and well defined and known positions. When the device is started these details are pointed out and identified in a suitably way, and their positions are determined and stored, for example through downloading from a CAD-system, or alternatively they are measured by the transducer. The details used as signal sources may be illuminated only from regular lights in the room, but certainly special light sources may be arranged to give the illumination the desired intensity or character if required. Certainly, at least some of the signal sources may be constituted by specially arranged markers, for example, by portions, patterns or figures of light tape placed on a dark background. In the Swedish patent number 458 427 it is closer described how the position and orientation of a transducer of this type may be calculated, as well as the construction and the function of an equipment for performing this calculation.

Hereinafter it will be describe a number of alternative examples of embodiments of the invention. In these firstly it will be described what is characteristic for respective embodiment and as concerns such that are in common to previously described embodiments it is referred to those. This especially concerns the function of the transducer unless otherwise is mentioned. Similar or corresponding components are provided with similar reference numbers throughout the whole description.

Figures 3, 4, 5:
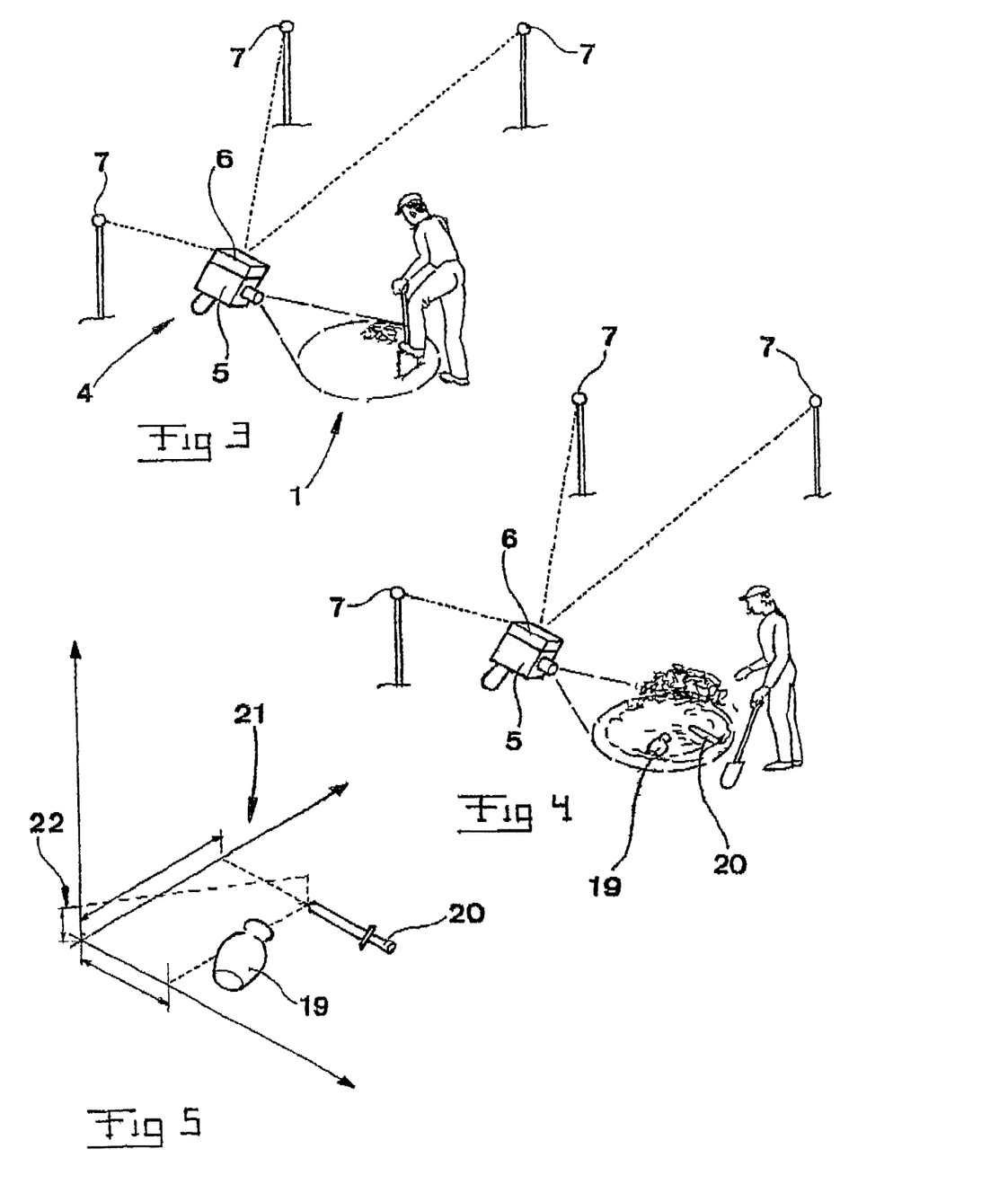
FIGS. 3 and 4 are perspective views illustrating an environment in which a variant of the method according to the invention is applied.
FIG. 5 is a schematic perspective view illustrating an example of a model which could be produced by applying the method according to FIGS. 3 and 4.
Figure 5:
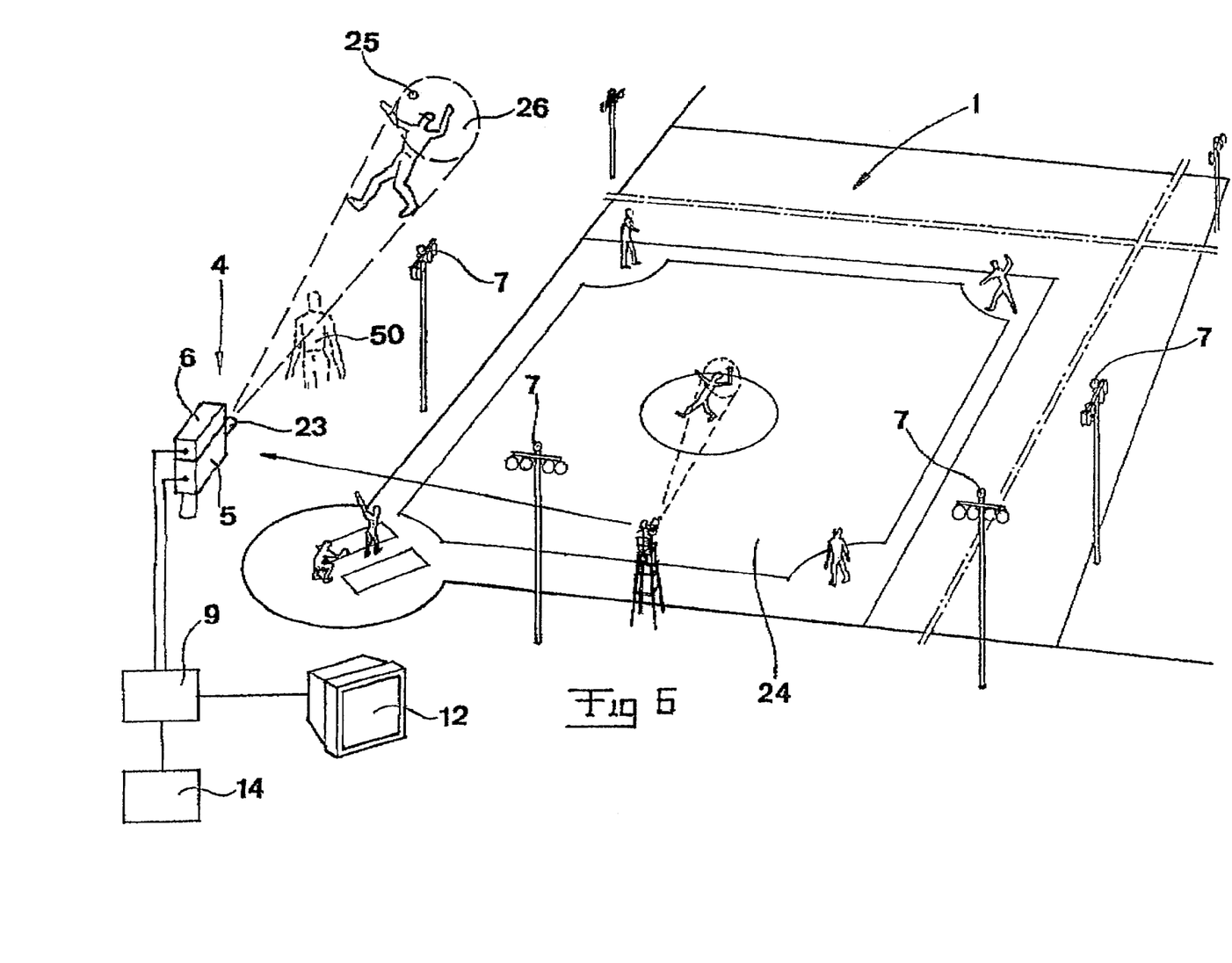

In FIGS. 3, 4 and 5 one embodiment of the method according to the invention is illustrated, which method comprises using the sensor 5 for picture recording and to alternately perform picture recording of the environment 1 and affect the properties of the environment through removal of one or more object 19, 20 of the environment, and to create a model 21 which imitates the properties of the environment 1, which was present before said removal/removals, by means of the picture information and the orientation and position information. In the example it is imagined that the application is documenting an environment 1 in connection with an archaeological excavation. However, the method would be used in many other applications, such as in clearing of demolished constructions such as houses, roads, bridges, etc after explosions or earthquakes, or in other applications where it is desired to affect an environment through irreversible modifications, and simultaneously create a model of the environment which represents the state immediately before this affect (for example clearing). The model may then give information or hints concerning also the original properties of the environment, such as the properties that the location for an archaeological excavation had during a particular previous period, the properties that were present at a building before the collapse thereof etc.

In FIG. 3 it is illustrated how a number of posts including the signal sources 7 have been located around the excavation area. With the device 4 according to the invention thus, it is produced information about the properties of the environment 1, first initially and then at a later moment after digging and possibly removing of ground masses, when any archaeological or other object 19, 20 has been found. Thereafter, the use of the device according to the invention and digging may be performed alternately and the method according to the invention repeated to the desired extent. The recording or measuring information obtained in this case, i.e. herein the picture information, and the orientation and position information, which together constitute data which defines/represents the properties of the environment 1, may then be used for creating a three-dimensional model 21 of the environment as it look like before the excavation. Since the device 4 according to the invention has the capability to record shape and texture as well, or other properties of a surface, of the environment, and by the fact that the shape and the surface properties may be treated independent of each other, an object which has been found may be imaged in detailed at a later moment by means of the device. Thereafter, the model which represents the finding place, the relative positions and/or orientations of the objects which have been found at the excavation, and possibly their positions/orientations in relation to the environment, may be provided with reproductions corresponding to the objects 19, 20 in for example ready-prepared and/or cleaned condition.

As an example, as schematically illustrated in FIG. 5, the relative positions of the discovered objects 19, 20, and the positions of the objects relative to the original ground surface 22, may be illustrated by the model.

In FIG. 6 an application of a variant of the device 4 according to the invention is illustrated, the environment 1 being constituted by a baseball arena or the like and the device 4 comprises the transducer 6 and the sensor 5, in the form of a film camera 5, and the required signal sources 7 located in the environment 1. The assembly consisting of the transducer 6 and the sensor 5, may be placed on a stand with a ball joint so an operator in an easy way may turn the film camera 5 to the desired position, or may be freely carried by the operator, for filming in the desired direction.

In this example the device is also designed to produce data for controlling an object 23, and in addition the device includes the object, which is constituted by a part of the sensor, or more precisely is constituted by the focus function 23 of the film camera 5. To provide for the control of the focus function 23, the film camera 5, as well as the transducer 6, communicates with the information processing unit 9. In this way the control of the focus function 23 may be performed on the basis of the recording or measuring information, i.e. the picture information, and the orientation and position information, so that focus all the time is adjusted in a desired plane. This may for example be the plane coinciding with the surface 24 of the baseball arena and if the appearance of the arena is known the focus may be controlled to be always adjusted on the surface of the arena even if the camera is paned or moved to film in another direction and/or some object get into the picture receiving area of the camera between the surface of the arena and the camera. Provided that the position of the ball 25 may be continuously determined with any suitable method, a further development would be that the device 4 according to the invention instead would be used for maintaining the focus on the ball 25 all the time and a freely movable camera 5 would be controlled to always be directed toward the ball. In FIG. 6 it is illustrated that focus is adjusted in a plane 26 which includes the position for the ball 25, in spite of that a player 50 is present between the ball 25 and the camera 5.

Certainly, also in this case a three-dimensional VR-model, illustrating the area and the players, could be created on a presentation means 12 to be used for example by a manager with the purpose of illustrating afterwards how one or more players should have acted in a certain situation and what this in such a case would have implied for the game. If more than one device according to the invention is simultaneously used it is possible to reproduce the current game from more viewing directions. For example the manager could see the game situation from an angle of view of a particular player by means of the model. Alternatively, by means of a plurality of devices according to the invention, each of which includes a transducer and a camera, a model could be created through which model a viewer interactively and in real time may participate in for example a football game, the viewer himself having the possibility to choose from which viewing position and/or direction the person in question desires to follow the game. With a plurality of devices according to the invention located at the arena the fact is that it is possible to obtain sufficient information for creating a model which is able to represent the game from a chosen viewing position and/or in a chosen viewing direction, in spite of that none of the cameras is present in the chosen viewing position and/or is directed in the chosen viewing direction.

Figure 7:
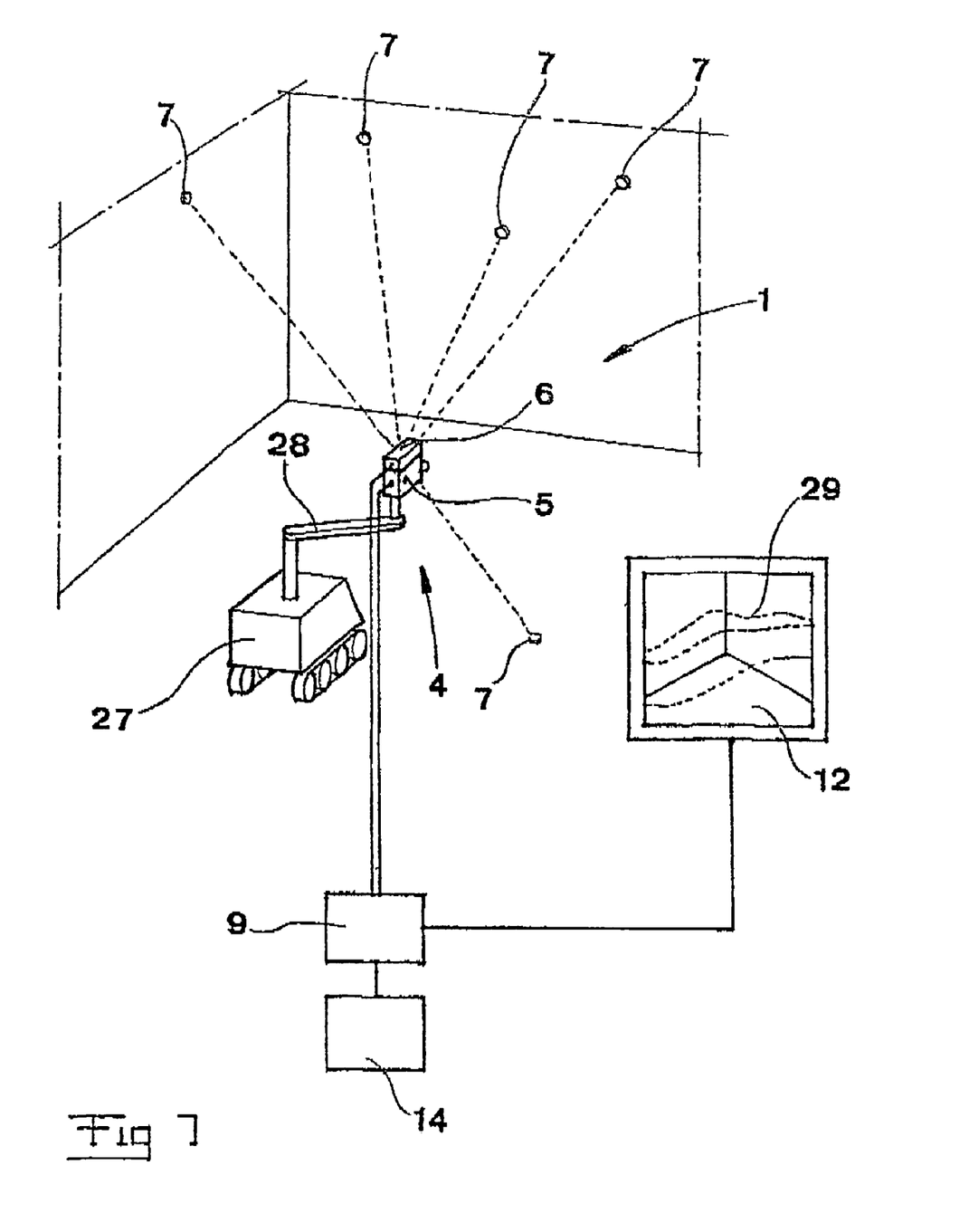
FIG. 7 is a perspective view of an environment in which a robot provided with a variant of the device according to the invention is controlled on the basis of produced property-information about the environment.

In FIG. 7 a further application of the device 4 according to the invention is illustrated. The environment 1 consists of a room and this is intended to be a part of an industrial plant where a radiation leakage has occurred. For mapping the radiation level in different positions in the room the device 4 according to the invention is used assembled on a remotely controlled robot 27 having a pivoted robot arm 28 for adjustment of the device in arbitrary positions and directions in the room.

The device includes the transducer 6 and the corresponding signal sources 7 constituted by markers placed in the environment or in the environment occurring objects in accordance with what is previously described.

The sensor 5 may in this case be a conventional GM-counter for measuring radiation intensities in different positions in the room. Furthermore, the device is connected to the information processing unit 9, which in its turn is connected to a presentation unit 12. By controlling the robot 27 to move around in the room and measure the radiation intensity a map or a model of the distribution of radiation may be obtained. This may show for example lines and/or surfaces 29 with constant radiation intensity on the presentation unit 12. By means of the recording or measuring information, obtained by means of the GM-counter, and the corresponding orientation and position information it may be calculated where in the environment 1 further measurements should be performed for obtaining sufficient amount of measurement results for creating the model and/or for tracking the current leakage. In this connection the robot 27 including the device 4 according to the invention may be controlled, with respect to movement in the room and movement of the robot arm 28, on the basis of the data that represent the properties of the environment and which have been produced by the device 4 according to the invention.

It should be pointed out that in this example of embodiment as well as in the other embodiments and applications described in this patent application, the creating of the model 13, 21, 29 may be performed "on-line", i.e. in real time and/or afterwards if so is desired.

Figure 8:
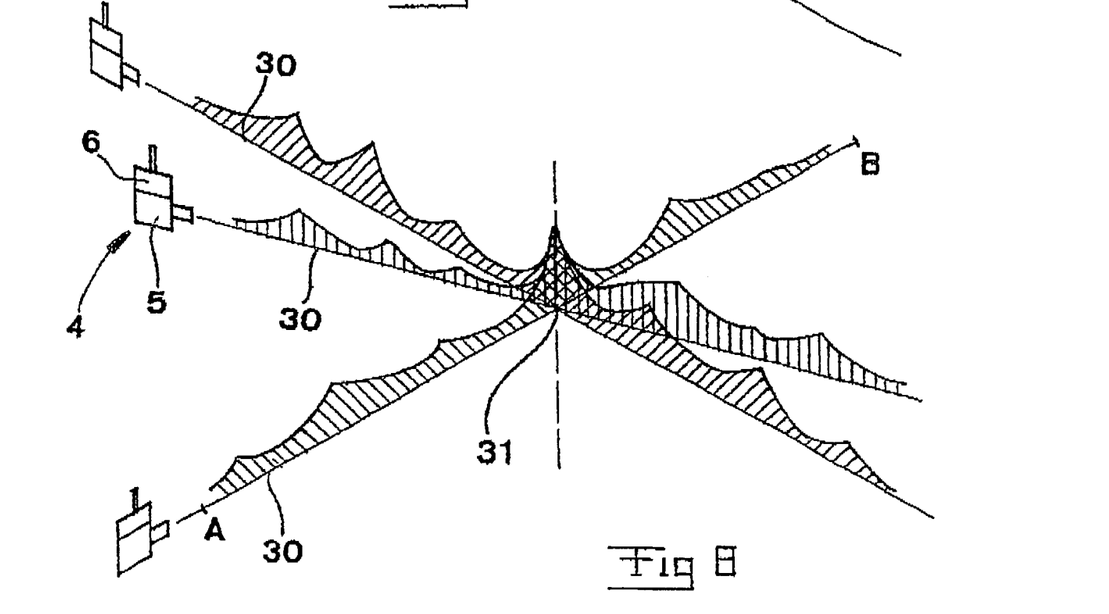
FIG. 8 is a perspective view illustrating measurements achieved by using a device according to the invention.

In FIG. 8 it is schematically illustrated the result of a few sub-measurements in a case when the device 4 according to the invention has been used for producing measuring results which are similar to or correspond to the result which are obtained in using conventional tomography. However, it should be emphasized that although some parts in this method/use of the device 4 according to the invention are similar or in common to the method which are applied in conventional tomography, it is the characteristics of the invention, among other in the shape of a freely movable sensor 5, the orientation and position of which repeatedly may be determined, that enables that recordings/measurements may be performed in a way that is different from prior art. By means of the device 4 according to the invention it is in fact possible to perform recordings/measurements in a outward manner, i.e. it is not required, such as usual in normal tomography, that for example a movable but mechanically guided radiation source emit X-radiation, which X-radiation then is detected by means of a detector, the tomographed object being located between the radiation source and the detector. With the device 4 according to the invention the environment may instead by carefully mapped in respect to its properties in different points and layers while the device may be moved freely in the environment and without the necessity to use a detector which has been placed in the environment.

The environment may be a proportionately large volume of the atmosphere including a traffic section, for example a crossing, in which traffic section percentages of some chemical compound/pollutant such as oxygen, carbon dioxide, etc or the value of some physical quantity, for example temperature, is desired to be determined. Before measurements are started signal sources are placed in a plurality of positions on posts, house walls, chimneys or on other suitable naturally occurring or placed objects in the environment. The type of sensor 5 may in this case be chosen depending on the current application. In some cases it would be required such a sensor that is able to transmit waves of any kind and receive a response on this waves as a function of the quantity which is intended to be measured, whereas in other cases it is sufficient that the sensor is able to receive waves originated from excitations in the environment.

For example, density measuring could be performed by means of an IR-sensor. Thus, the invention relates to the use of a device according to the invention for determining one or more properties along lines 30 in an environment at one or more common positions 31 of said lines 30, especially for producing information concerning the properties of the environment for different layers in the environment. In FIG. 8 it is illustrated how the value of a quantity varies along different lines 30. During measurement the integrated value between two positions A and B is obtained. Through repeated measurements from different positions in different directions, most often a large number of measurements, information about the value of the quantity considered in points 31 common to the measurement lines 30 may be obtained with a higher accuracy without the need of large mechanical constructions which hold and move the sensor and without the need of time measuring of the signals (waves) which are recorded/measured along the current lines.

Another important use of the device according to the invention is to determine the position and orientation of a camera relative to an environment when using the camera for filming, and particularly for producing data to be used in a subsequent supplementary animation of the recorded film. In this case one embodiment of the method according to the invention comprises the use of a camera constituting the sensor for picture recording and determining the orientation and the position of the camera relative to the environment when using the camera for filming. This results in great advantages in filming since it enables the camera to be guided to the desired positions and orientations and/or to determine afterwards how the camera was placed and orientated during a certain picture recording sequence. This is possible to perform without the camera necessarily need to be fixed or guided by some mechanical vehicle. Instead the camera may be moved freely to different positions and orientations depending on the desired film situation. For example a person who move himself would be filmed while the device according to the invention is brought to follow the person from the desired filming angles and positions. In this case, it may be produced data by means of the picture information and the corresponding orientation and position information, which are of great importance, or which are a requirement, for example in a subsequent modelling and/or animation of the current film sequence.

Figure 9:
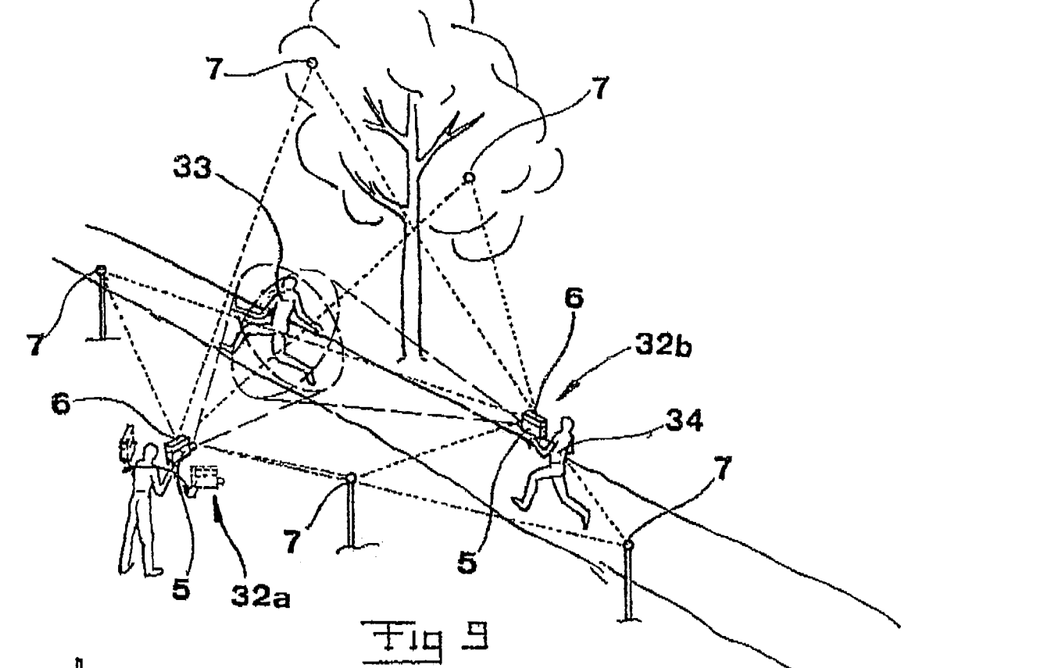
FIG. 9 is an embodiment of the device according to the invention including two assemblies each provided with a sensor and a transducer.

In FIG. 9 an embodiment of the device according to the invention is illustrated, the device including two assemblies 32a, 32b each of which comprises a sensor 5 and a transducer 6. Certainly, it is possible to use further such assemblies 32 to the desired extent. Generally, such as described in connection to the previous embodiment, it is fully sufficient with one said assembly for picture recording for instance, at least in the case the environment is stationary. However, if there is movable objects/phenomena in the environment, such as illustrated in FIG. 9, where a running person 33 is an object for filming, it may be advantageously to use two or more separate assemblies of the type mentioned above. This application makes it possible to obtain a more complete information concerning the characteristics of a movable object. In FIG. 9, in accordance with what is previously described, the transducers 6 are intended to receive signals from signal sources 7 in the environment 1, so that the orientation and position information for respective sensor, i.e. respective camera 5, related to the current picture recording, may be continuously obtained. In the example one assembly 32a is imagined to be stationary in so fat that it is moved through turning so that the assembly follow the running person 33 when he pass. The second assembly 32b is intended to be carried and brought by a running person 34 which follow after the running person 33 which is the object for the filming.

It is obvious that the device according to the invention and the method according to the invention are not restricted to the exemplified embodiments. Several modification possibilities have already been mentioned above. Further, such possibilities are obvious for a man skilled in the art once the idea of the invention has been introduced. Accordingly, it is emphasized that the invention is restricted only to the scope of protection which is defined by the following claims and that equivalent embodiments are included within the frame of patent protection.

The invention claimed is:

1. A device for producing information concerning one or more properties of an environment (1), the device comprising:
   a) a sensor (5) movable in relation to the environment, the sensor obtaining information from the environment by recording or measuring one or more properties of the environment in one or more positions and/or directions, and
   b) a transducer (6) mechanically connected to the sensor (5) so that the relative positions and orientations of the sensor and the transducer are fixable,
   the transducer being arranged to determine its orientation and position with respect to at least four degrees of freedom relative to the environment (1) by
   i) receiving incident signals from at least three signal sources (7) in the environment, and
   ii) calculating and using the direction ($\phi_1$, $\Theta_1$; $\phi_2$, $\Theta_2$; $\phi_3$, $\Theta_3$) of each sight line extending between respective signal source and the transducer, and
   iii) thereby producing corresponding information concerning the orientation and the position of the sensor, with respect to at least four degrees of freedom of the sensor, relative to the environment, for at least three said recordings or measurings accomplished by the sensor (5), wherein
   said produced corresponding information concerning the orientation and the position of the sensor including non-linear property knowledge of the sensor, with respect to said at least four degrees of freedom of the sensor, relative to the environment, for said at least three said recordings or measurings accomplished by the sensor (5) are combined,
   the transducer is a camera,
   the device emits said measured environmental information of the one or more properties of the environment, in one of
   1) for the sensor obtaining the environmental information in 0 to 2 dimensions, in at least one more dimension than the number of dimensions obtained by the sensor, and 2) for the sensor obtaining the environmental information in 3 dimensions, in at least 3 dimensions, and
   said emitted measured environmental information of the one or more properties of the environment and said orientation and position information defines at least one property of the environment.

2. A device according to claim 1, wherein the transducer (6) is arranged to repeatedly determine its orientation and position relative to the environment when the transducer (6) and the environment (1) are moved relative to each other.

3. A device according to claim 1, wherein the transducer (6) is arranged to be freely movable and mechanically unguided by the environment in an arbitrary coordinate system when the transducer (6) and the environment (1) are moved relative to each other.

4. A device according to claim 1, wherein,
the signal receiving direction area of the transducer constitutes a solid angle that exceeds 2 steradians, and
the signal receiving direction area is formed by the collected amount of signal receiving directions that the transducer is arranged to receive incident signals from said signal sources (7).

5. A device according to claim 4, wherein the signal receiving direction area of the transducer constitutes a solid angle that exceeds 4 steradians.

6. A device according to claim 4, wherein the signal receiving direction area of the transducer is topologically connected.

7. A device according to claim 6, wherein,
the camera is a ccd-camera.

8. A device according to claim 1, further comprising:
an information processing unit (9) processing the recording or measuring information and the orientation and position information for producing data that represents the at least one property of the environment; and
means (10,11) arranged for establishing connections for communication of information
i) between the sensor (5) and the information processing unit (9), and
ii) between the transducer (6) and the information processing unit (9).

9. A device according to claim 1, wherein information for supplementing a model (13) of the environment is produced.

10. A device according to claim 1 wherein information for production of a model (13) of the environment is produced.

11. A device according to claim 1, wherein information for a computer graphic model (13) is produced.

12. A device according to claim 1 wherein information for controlling an object (23,27) is produced.

13. A device according to claim 12, further comprising the object (23).

14. A device according to claim 13, wherein the sensor (5) or any part thereof constitutes the object (23).

15. A device according to claim 1, further comprising the signal sources (7) arranged in the environment (1).

16. A device according to claim 15, wherein the signal sources (7) are active signal emitting signal sources.

17. A device according to claim 15, wherein the signal sources (7) are passive members reflecting signals that are incident to said members.

18. A device according to claim 17, further comprising means (18) for transmitting signals and wherein the signal sources (7) reflect signals transmitted from the signal transmitting means.

19. A device according to claim 1, wherein,
the transducer (6) functions to receive signals transmitted from the signal sources (7) and to record the relative incident directions of the signals received in relation to the transducer.

20. A device according to claim 19, wherein,
the transducer (6) has a surface (16) to receive signals transmitted from the signal sources, and
the transducer records the relative incident directions of the signals received in relation to the surface.

21. A device according to claim 1, wherein,
the transducer has a surface to receive signals transmitted from the signal sources, and the transducer records the relative incident positions of the received signals on the surface.

22. A device according to claim 1, wherein the sensor (5) is an instrument recording one or more physical and/or chemical states present in the environment.

23. A device according to claim 1, wherein the sensor (5) is an instrument measuring one or more physical and/or chemical quantities present in the environment.

24. A device according to claim 1, wherein the sensor (5b) and the transducer (6b) have a unit (17) in common.

25. A device according to claim 24, wherein the unit in common is a detector (17).

26. A device according to claim 1, further comprising:
two or more assemblies (32), each assembly comprising one said sensor (5) and one said transducer (6).

27. The device of claim 1, wherein,
the transducer determines its orientation and position with respect to the at least four degrees of freedom relative to the environment (1) by
making direct angular measurements of the received incident signals from the at least three signal sources (7).

28. The device of claim 1, wherein,
the transducer determines its orientation and position with respect to the at least four degrees of freedom relative to the environment (1) by making direct angular measurements of the received incident signals from the at least three signal sources (7) in the environment independent of both
i) propagation time of the received incident signals, and
ii) intensity of the received incident signals.

29. The device of claim 1, wherein,
the transducer determines its orientation and position with respect to the at least four degrees of freedom relative to the environment (1)
i) by recording relative incident directions of the received incident signals from the at least three signal sources (7) in the environment, and
ii) by calculating and using the direction ($\phi_1$, $\Theta_1$; $\phi_2$, $\Theta_2$; $\phi_3$, $\Theta_3$) of each sight line extending between respective signal source and the transducer.

30. A device according to claim 1, wherein,
the sensor measures the property along a line.

31. A device according to claim 1, wherein,
the sensor measures the property over a non-point, surface area.

32. A device according to claim 1, wherein,
the sensor measures the property at a point.

* * * * *